3,062,885
METHOD OF PRODUCTION OF 2,3,4,6-TETRA-NITROANILINE
Lloyd A. Kaplan, Adelphi, Md., assignor to the United States of America as represented by the Secretary of the Navy
No Drawing. Filed May 7, 1959, Ser. No. 811,768
4 Claims. (Cl. 260—578)
(Granted under Title 35, U.S. Code (1952), sec. 266)

The invention described herein may be manufactured and used by or for the Government of the United States of America for governmental purposes without the payment of any royalties thereon or therefor.

This invention relates generally to the chemical processing art and is more particularly concerned with an improved method for the preparation of 2,3,4,6-tetranitroaniline, by nitration of meta nitroaniline.

It has long been known that tetranitroaniline, because of its high percentage of nitrogen and oxygen, high resistance to heat and mechanical influences, is suitable as an explosive or as an intermediate in the manufacture of explosives. For example, 2,3,4,6-tetranitroaniline is widely used as an intermediate in the production of 1,3-diamino-2,4,6-trinitrobenzene. Formerly, tetranitroaniline (TNA) was prepared by nitrating meta-nitroaniline with mixtures of inorganic nitrates or nitric acid and sulfuric acid or oleum. This procedure included mixing the reactants and heating them or allowing them to stand at ambient temperature for several days. This procedure is more fully described in U.S. Patent No. 1,045,011.

Although it was more or less satisfactory on a laboratory scale operation, it has several disadvantages. One of these was that nitramine, the intermediate formed remains in the mixture for prolonged periods and upon heating of the reacting mixture to 70°–100° C., the nitramine decomposes emitting flashes of fire. Since the mixture itself is potentially explosive, the danger of detonation by the decomposition of the nitramine is always present.

Furthermore, considerable difficulty is encountered in controlling the reaction rates during the heating cycle due again to the decomposition of the nitramine formed. This results in violent decomposition of the TNA or at least increases the reaction rate so that it becomes uncontrollable. Because of the buildup of nitramine in the reaction mixture, it was considered impossible prior to this invention to nitrate meta-aniline to produce TNA by a continuous process.

It is an object of this invention to provide a new and improved process for the nitration of meta-nitroaniline to TNA which may be a continuous or a batch type process according to the preference of the operator.

Another object is the provision of a new method of producing TNA wherein the "steady-state" concentration of intermediate nitramine is essentially zero throughout the reaction period thereby eliminating the danger of decomposition or explosion of the entire mixture due to sparking of the nitramine.

It is another object of this invention to provide a new and improved process for the manufacture of TNA wherein the amount of concentrated sulfuric acid employed can be substantially reduced.

These objects as well as many others will become more readily apparent to those skilled in this art upon reading the following specification.

The principal overall reaction taking place in this invention is:

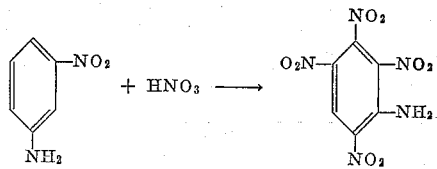

In practicing the invention, the inorganic nitrates which could optionally be employed in the prior art process are not used, instead nitric acid is employed as the nitrating agent. In contrast to the older procedures as exemplified by the foregoing patent, the meta-nitroaniline is dissolved in concentrated sulfuric acid prior to mixing of the nitric acid. Oleum is added to the nitric acid in sufficient amounts to combine with any water present in the nitric acid and thereby reduce the heat of solution produced on mixing the nitric acid with the meta-nitroaniline-sulfuric acid solution. This permits better control of the reaction temperature and prevents decomposition of TNA as it is formed due to excessive reaction temperature. If 100% conc. nitric acid is employed rather than the standard commercial concentrated nitric acid (90%), the oleum may be eliminated.

In the batch process the meta-nitroaniline-sulfuric acid solution is preferably preheated up to about 50–70° C. prior to the addition of the nitric acid-oleum solution. This prevents buildup of a significant concentration of nitramine intermediates since at this temperature it reacts as fast as it is formed to yield TNA.

The process will become more clear upon reading the following illustrative example.

Example I

The following solutions were prepared:
Solution A.—690 grams of meta-nitroaniline dissolved in 6 liters of concentrated sulfuric acid.
Solution B.—2.4 liters of 30% oleum and 1.05 liters of 90% nitric acid.

A five liter water jacketed flask with a stopcock drain in the bottom was fitted with a stirrer and thermometer. Hot water at about 60–65° C. was run rapidly through the jacket. The flask was charged with 800 cc. of solution A and stirrer started. When the contents of the flask had reached the temperature of at least 45° C., four hundred cc. of solution B was added as rapidly as possible. The mixture was stirred for three minutes, during which time the temperature of the contents of the flask rose to over 100° C. (about 110° C.) then fell. At the end of this time, the contents were withdrawn through the drain and the TNA was obtained by the usual procedure of drowning in ice. The yield of TNA produced was 65% of the theoretical yield, and exhibited a melting point between 207° C. and 211° C.

As stated hereinbefore it is critical that the temperature of solution A be at least 45° C. before solution B is added. The reason for this is that the reaction of the meta-nitroaniline with the ingredients of solution B produces nitramine which at reaction temperatures of less than 45° C. is quite stable in the presence of the reaction mixture. Therefore this intermediate will build up to dangerously large concentrations. On the other hand, the rate of reaction of nitramine to TNA is very slow, compared to the rate of formation of nitramine, at temperatures below 45° C. Of course, at lower temperatures the nitramine remains for rather long periods of time before it is reacted to form the TNA thereby causing a hazard which is not present when the temperature of the flask is kept above 45° C., so that the nitramine formed is rapidly converted to TNA.

It is also essential that the meta-nitroaniline be dissolved in the concentrated sulfuric acid prior to mixing with nitric acid. This permits dissipation of the heat evolved when the meta-nitroaniline (which is a base) is neutralized by the sulfuric acid. Only by carrying out this neutralization prior to the nitration, is it possible to adequately control the reaction temperature. Furthermore, the solution of meta-nitroaniline in sulfuric acid is easier to handle than solid meta-nitroaniline.

*Example II*

The ratio of the reactants in Example I was 1 part meta-nitroaniline, 15.5 parts concentrated $H_2SO_4$, 2.2 parts nitric acid, and 6.75 parts of oleum. This ratio was changed by reducing the amount of concentrated sulfuric acid to one-half of that in Example I so that the ratio of the reactants (in the order given in the preceding sentence) was: 1:7.75:2.2:6.75. The procedure of Example I was followed and the resulting TNA was found to have the same purity as that of Example I and the yield of TNA was essentially the same as Example I. It should be noted that the amount of concentrated $H_2SO_4$ used in this example is less than half of the minimum amount required by the prior art methods. Furthermore, this amount may be decreased even more, if desired.

*Example III*

Solution A was prepared as in Example I. Solution B was prepared by mixing together 1.19 liters of 20% oleum with 1.05 liters of 90% nitric acid. A reduced quantity of oleum was used so that the amount of free sulfur trioxide present in the oleum used was just equal to the stoichiometric quantity necessary to completely react with the water in the nitric acid to form sulfuric acid. The volumes of solutions A and B, mixed together in the same manner as in Example I were such that the ratio of meta-nitroaniline to nitric acid was the same as in Example I. The same yield of pure TNA was produced.

*Example IV*

In order to determine the adaptability of this reaction to a continuous process the following solutions were prepared:

Solution A.—690 grams of meta-nitroaniline dissolved in three liters of concentrated $H_2SO_4$.

Solution B.—2.4 liters of oleum were added to 1.05 liters of 90% nitric acid.

In an apparatus similar to that described in Example I were placed about 1,000 cc. of "spent" acid i.e., previously reacted mixture of solutions A and B. This mixture was heated to 50°–60° C. by passing hot water through the jacket of the apparatus. When the desired temperature was reached, equal volumes of solutions A and B were run into the flask at a rate to maintain the temperature of the contents between about 70° to 80° C. Contents of the flask were continuously stirred during the reaction. When the volume in the flask had reached about 3,000 cc., the additions were stopped and the contents of the flask withdrawn until the volume of material remaining was about 1,000 cc. Additions of solutions A and B were again started and the above procedures repeated until all the reactants had been put through the process. The TNA was obtained from this reaction by filtering directly. By the "continuous" procedure the yield was increased to 70 to 75% and the melting point of the product was 210–214°.

The yields indicated that this process can be run continuously as well as batchwise. Since a continuous process enables more economical production of TNA, it is generally to be preferred when large amounts are to be made.

Since the reaction time takes only about two minutes when the optimum temperatures are maintained it is possible to use apparatus wherein the reactants are added and the products are removed simultaneously. This may be accomplished in the following manner:

*Example V*

A glass pipe having an internal diameter of about two inches and a plurality of internal baffles was inclined at an angle of about 13° and the solutions A and B of Example IV preheated to 60–70°, were poured together into the upper end of the pipe at such a rate that it took about two minutes for the liquid to flow through the pipe. The material flowing out of the end of the pipe was a slurry of TNA in spent acid. The TNA was removed from the slurry by drowning in ice water although it is to be understood, of course, that optionally it could have been filtered directly as in Example IV. The pipe and the baffle used in this case were made of glass. However, any material resistant to attack by the reactants or by the products would be suitable for use. The pipe itself was surrounded with a water jacket which was maintained at about 65–70° C. so that the temperature of the material flowing in the pipe was maintained between 70 and 80° C. by the exothermic nature of the reaction.

From the foregoing it can be seen that in carrying out the batch process it is permissible to vary the temperature limits from about 45° C. up to about 135° C. In one instance, a mixture of solutions A and B of Example I was heated to 200° C. without fume off of the products. This is not, however, recommended since it does not yield any TNA. The optimum conditions for the batch process are an initial temperature of 55–60° C. and a maximum of 100–110° C. In the continuous process, the best results are obtained as explained hereinbefore when the reaction materials are preheated to 60°–70° C. and the reacting mixture is maintained at a temperature between 70–80° C.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. The process of nitrating meta-nitroaniline to form 2,3,4,6-tetranitroaniline comprising the steps of: dissolving one part by weight of meta-nitronaline in about seven to fifteen parts by weight of sulfuric acid to form a first solution, mixing an amount of nitric acid at least stoichiometrically sufficient to nitrate said meta-nitroaniline in the first solution to 2,3,4,6-tetranitroaniline together with an amount of oleum containing at least sufficient sulfur trioxide to completely react with any water present in said nitric acid to form a second solution, heating said first and said second solutions to a temperature greater than 45° C. but not exceeding 110° C., continuously introducing each of said solutions into a reaction vessel to form a mixture thereof thereby to produce 2,3,4,6-tetranitroaniline suspended in spent acid, continuously withdrawing the spent acid from the reaction vessel, and removing the 2,3,4,6-tetranitroaniline from the spent acid.

2. The process of claim 1 further comprising the step of maintaining the temperature of the commixed solution in the reaction vessel at about 70° C.–80° C.

3. The process of claim 1 wherein the first and second solutions are each preheated to a temperature of 45° C. to 70° C.

4. The process of claim 1 wherein the first and second solutions are each preheated to a temperature of 60° C.–70° C.

References Cited in the file of this patent

UNITED STATES PATENTS 1,045,011    Flurschiem _____ Nov. 19, 1912